UNITED STATES PATENT OFFICE.

JONATHAN K. LIPPEN, OF BATTLE CREEK, MICHIGAN, ASSIGNOR TO POSTUM CEREAL COMPANY, OF BATTLE CREEK, MICHIGAN, A CORPORATION OF MICHIGAN.

SOLID SOLUBLE BEVERAGE EXTRACT.

1,326,751.  Specification of Letters Patent.  Patented Dec. 30, 1919.

No Drawing.   Application filed April 1, 1918.  Serial No. 226,056.

*To all whom it may concern:*

Be it known that I, JONATHAN K. LIPPEN, a citizen of the United States of America, and a resident of Battle Creek, Michigan, have invented a new and useful Improvement in Solid Soluble Beverage Extracts, which invention is fully set forth in the following specification.

This invention relates to beverage extracts, and more particularly to solid soluble extracts of roasted cereals and saccharine materials, and has for its object to provide a beverage extract of this kind which will readily dissolve in hot water to produce a beverage resembling coffee in flavor without containing coffee, and which will be healthful and nutritious.

Heretofore wheat has entered largely into the composition of the starting materials for the preparation of cereal coffee extracts, such as that described in U. S. Patent No. 1,031,962 to Willis H. Post, but the demands for this cereal and the necessity of conserving it make it desirable to eliminate as far as possible the use of wheat in beverage extracts.

I have discovered that an excellent beverage extract may be made from a roasted mixture of rye middlings, dextrinized wheat and barley malt flours, dextrinized starch, and a saccharine material such as New Orleans molasses.

By way of illustration, the ingredients are preferably employed in the following proportions, though these proportions may be varied within comparatively wide limits without sacrificing the objects of the invention. The parts are given by weight.

Rye middling 30 parts, dextrinized starch or dextrin 35 parts, a mixture of dextrinized wheat flour and barley malt flour (9 parts of the former and 1 part of the latter) 10 parts, and New Orleans molasses 25 parts.

The dextrinized wheat and barley malt flour are produced by subjecting wheat flour and barley malt flour to dry heat at dextrinizing temperatures varying between the limits of 210° C. to 280° C. The cereal materials are thoroughly mixed with the molasses and cooked for about twenty minutes under 15 lbs. pressure, or for thirty to forty-five minutes if open cooking is employed. The cooking in the presence of the moisture of the molasses effects the gelatinization of the unconverted starch and aids in producing a homogeneous mixture for roasting. The step of cooking may be effected as a part of the roasting operation. The mixture naturally contains considerable water (20% to 25%) and, if it is placed in the roaster and heated up to the roasting temperature, cooking will take place during the heating and a homogeneous mixture will be produced. The mass is next mixed with dextrinized starch and dried under continuous agitation which leaves it, when dry, in granular form. The resulting granular mass is then roasted to develop flavor and color, the temperature being carried to a point of thorough caramelization. Having prepared the roasted products from which the solid extract is to be made, I next treat the product with water to dissolve its soluble constituents. Either a part or all the soluble constituents may be removed, depending on the desired characteristics of the solid extract in matters pertaining to flavor, aroma, etc. The extraction may be effected by treating the roasted product with either cold or warm water, or by boiling the same therewith, but I prefer to use percolation with boiling water, thereby obtaining a solution which readily filters clear. Furthermore, percolation permits control of the extraction whereby extracts of different strength and qualities may be prepared, if desired. While the aqueous extract from the roasted products, prepared as above described, may be and sometimes does yield as high as 50% in soluble extractive matter, and makes an excellent beverage, yet an extract of 30% possesses in a marked degree the desirable properties of the roasted product. No particular apparatus for percolating need be described, as it forms no part of the present invention, such devices being well known and on the market. The clear aqueous solution is next concentrated by evaporation. This operation is preferably conducted *in vacuo*, such as obtained in a vacuum evaporation pan, and with care to prevent loss of volatile matters other than water. While the temperature in the vacuum pan may vary within considerably wide limits during the early stages of evaporation, a temperature in the neighborhood of 50° C. has been found satisfactory. This operation is continued until the aqueous extract is concentrated to a point where it contains from about 30% to 50% solids in solution. The strength of this extract will vary somewhat according to the plan adopted for the final drying, which may be conducted on trays in a vacuum chamber or a rotary drum *in vacuo*. Open evaporation and drying is not advisable. In case a vacuum pan is used for the final evaporation, the aqueous extract may be concentrated to the point of containing about 30 to 50% solids. It is obvious that the same pans as used for concentration may be used for drying, though it is preferable to transfer the concentrate to new pans. While water to considerable extent is present in the mass, no further precautions are needed as to temperature than those taken during the initial moisture evaporation. When, however, the moisture is reduced to only a few percent., the temperature should be so regulated that overheating of the product does not occur. A temperature of about 60° C. has been found to be safe for this purpose. At the very end of drying, and while traces of water still remain, the temperature may and preferably is lowered, permitting the heat of the mass to drive off the last portions while cooling. The product is scraped or otherwise removed from the pan, and reduced, as by grinding, preferably to a coarsely granulated condition. In the event that film evaporation is practised with a revoluble drum in a vacuum chamber, the first concentration or density of the aqueous extract is adjusted to the requirements of the particular drum apparatus employed, such as in matters of surface exposed, speed of rotation, temperature, etc. In general, however, the fluid extract may have a strength of about 45% when applied to the drum. In drying the extract on a drum, it is particularly desirable to remove the solid mass from the drum surface before complete dryness is attained, to avoid overheating the product, the heat retained by the mass being relied on to remove the last portions of moisture while the product is still inside the vacuum chamber. The dried extract is comminuted preferably in a coarse granular form, and is ready for packing. By comminuted I intend to include the condition of the extract in the form of grains, powder, flakes or other subdivided form assumed by the dry extract. The resulting product is a beverage extract in granular or comminuted form, and of extreme solubility in water, either hot or cold, and when a level teaspoonful of the extract is dissolved in a cup of hot water, solution is effected in one minute or less, and produces a beverage having the pleasant blended flavors of the original roasted materials. The dry extract, while varying somewhat in color, is usually amber brown to black, and is semi-transparent on the fractured edges of the granules when they are prepared as above described.

In lieu of molasses, other saccharine substances may be used, such as sugars, syrups (either cane or glucose), or sugar-containing fruits such as figs, prunes or the like. Instead or rye middlings which contain bran, other cereal brans may be employed, such as that made from wheat or other cereal, and the dextrinized wheat flour may be reduced in quantity or omitted, but I prefer to use the materials specified in the example.

The process herein described, but not claimed, involving the steps of dextrinizing by dry heat, followed by cooking and roasting, is described and claimed in my application Serial No. 226,055, filed of even date herewith.

What is claimed is:—

1. A solid soluble extract of a roasted mixture of rye middlings, dextrinized wheat flour and barley malt flour, dextrinized starch and molasses, said extract containing caramelized dextrins and caramelized molasses, and being readily soluble in hot water and having a flavor simulating that of coffee.

2. A solid soluble extract of a roasted mixture of a cereal product containing bran, dextrinized wheat flour and barley malt flour, dextrinized starch and a saccharine body, said extract containing carmelized dextrins and caramelized saccharine matter, and being readily soluble in hot water and having a flavor simulating that of coffee.

3. A solid soluble extract of a roasted mixture of a cereal product containing bran, dextrinized barley malt flour, dextrinized starch and a saccharine body, said extract containing caramelized dextrins and caramelized saccharine matter, and being readily soluble in hot water and having a flavor simulating that of coffee.

In testimony whereof I have signed this specification.

JONATHAN K. LIPPEN.